United States Patent
Han et al.

(10) Patent No.: US 9,294,521 B2
(45) Date of Patent: Mar. 22, 2016

(54) METHOD, DEVICE AND SYSTEM FOR PROCESSING STREAMING MEDIA SERVICE DATA

(71) Applicant: Huawei Technologies Co., LTD, Shenzhen (CN)

(72) Inventors: Guanglin Han, Beijing (CN); Jian Zhang, Beijing (CN); Weiwei Song, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/285,333

(22) Filed: May 22, 2014

(65) Prior Publication Data

US 2014/0254489 A1   Sep. 11, 2014

Related U.S. Application Data

(63) Continuation of application No. PCT/CN2012/085159, filed on Nov. 23, 2012.

(30) Foreign Application Priority Data

Nov. 23, 2011  (CN) .......................... 2011 1 0376595

(51) Int. Cl.
| | |
|---|---|
| *H04L 29/06* | (2006.01) |
| *H04W 4/20* | (2009.01) |
| *H04W 76/06* | (2009.01) |
| *H04W 80/12* | (2009.01) |
| *H04W 74/04* | (2009.01) |

(52) U.S. Cl.
CPC ........ *H04L 65/1089* (2013.01); *H04L 65/4084* (2013.01); *H04L 65/4092* (2013.01); *H04W 4/20* (2013.01); *H04W 74/04* (2013.01); *H04W 76/06* (2013.01); *H04W 80/12* (2013.01)

(58) Field of Classification Search
CPC . H04W 64/08; H04W 84/045; H04L 65/1093
USPC .......................... 370/328, 329, 331, 230, 315
See application file for complete search history.

(56) References Cited

U.S. PATENT DOCUMENTS

| | | | |
|---|---|---|---|
| 8,149,771 B2 * | 4/2012 | Khivesara et al. ............ | 370/329 |
| 2003/0079020 A1 * | 4/2003 | Gourraud et al. ............. | 709/227 |
| 2012/0069766 A1 * | 3/2012 | Fu et al. ....................... | 370/252 |

FOREIGN PATENT DOCUMENTS

| | | |
|---|---|---|
| CN | 101026742 A | 8/2007 |
| CN | 101431720 A | 5/2009 |

(Continued)

OTHER PUBLICATIONS

Extended European Search Report received in Application No. 12851127.6-1870 mailed Mar. 27, 2014, 6 pages.

(Continued)

*Primary Examiner* — Jamal Javaid
(74) *Attorney, Agent, or Firm* — Slater & Matsil, L.L.P.

(57) ABSTRACT

Embodiments of the present invention disclose a method, device, and system for processing streaming media service data. When a user equipment detects a service terminate operation or a service switching operation performed by a user, the user equipment sends a scheduling terminate message to a scheduling device, so that the scheduling device can timely learn that the user equipment has stopped a streaming media service being performed, and immediately stop scheduling, according to the scheduling terminate message, streaming media service data requested by the user equipment to the user equipment.

15 Claims, 4 Drawing Sheets

(56) References Cited

FOREIGN PATENT DOCUMENTS

| CN | 101610556 A | 12/2009 |
|---|---|---|
| EP | 1819185 A1 | 8/2007 |
| WO | 2009128755 A1 | 10/2009 |

OTHER PUBLICATIONS

International Search Report received in Application No. PCT/CN2012/085159 mailed Feb. 28, 2013, 4 pages.

* cited by examiner

METHOD, DEVICE AND SYSTEM FOR PROCESSING STREAMING MEDIA SERVICE DATA

CROSS-REFERENCE TO RELATED APPLICATIONS

This application is a continuation of International Application No. PCT/CN2012/085159, filed on Nov. 23, 2012, which claims priority to Chinese Patent Application No. 201110376595.7, filed on Nov. 23, 2011, both of which are hereby incorporated by reference in their entireties.

TECHNICAL FIELD

The present invention relates to the field of wireless network communication technologies, and in particular embodiments, to a method, a device, and a system for processing streaming media service data.

BACKGROUND

Streaming media refers to continuous time-based media transmitted by using the streaming technology in a network, and is the technical basis of Internet Protocol phone (IP phone), video conference and other applications. Along with the continuous improvement of the mobile Internet technology and the constant rising of a data transmission speed, streaming media service data transmission (for example, video watching or making a video call) on a user equipment (mobile terminal) has come into reality.

The following uses video watching as an example to describe a transmission process of video service data in an LTE (long term evolution) network.

As shown in FIG. 1, when a UE (user equipment) needs to play a video, the following steps are performed.

In step 101, a session is established between a UE and a Server (server) that provides a video in a core network. Once the session is established, the UE performs step 102, i.e., sending, to the Server, a video play request, including an identifier of the video needed to be played. After the Server receives the video play request, step 103 is performed, i.e., sending the service data of a requested video to the UE.

The above service data sent to UE by the Server first reaches an eNodeB (evolved NodeB). If there are schedulable resources on the eNodeB, the eNodeB performs step 104 i.e., scheduling the service data to the UE by using an LTE air interface. Otherwise, the eNodeB caches the service data, and until schedulable resources appear, performs step 104. After the service data is received, the UE begins to play the video.

When the UE stops the currently played video, the UE performs step 105, i.e., sending a video service terminate instruction to the Server via LTE application-layer signaling. After receiving the video service terminate instruction, the Server stops delivering the service data of the video requested by the UE.

The eNodeB is only responsible for transmitting the video service terminate instruction, without parsing the content of the instruction. Therefore, the eNodeB does not learn that UE has stopped the currently played video, and continues to schedule the cached service data to the UE by using the LTE air interface. In this case, the video playing has been stopped, and therefore, the UE does not need the service data of the video, resulting in a waste of LTE air interface resources on the eNodeB due to transmission of this part of service data.

In addition, a delay exists in transmission of the video service terminate instruction in a communication network.

Therefore, the Server continues to send the service data of the video requested by the UE to the eNodeB during the period from stopping, by the UE, currently played video to receiving, by the Server, the video service terminate instruction, while the eNodeB schedules the service data that is not required by the UE to the UE by using the LTE air interface, further intensifying the waste of LTE air interface resources on the eNodeB.

SUMMARY OF THE INVENTION

Embodiments of the invention provide a method, a device, and a system for processing streaming media service data, capable of significantly reducing the waste of LTE air interface resources.

In order to achieve the above objectives, the embodiments of the present invention employ following technical solutions.

An embodiment method for processing streaming media service data is provided. When detecting a service terminate operation or a service switching operation performed by a user, a user equipment sends a scheduling terminate message to a scheduling device, so that the scheduling device stops scheduling, according to the scheduling terminate message, streaming media service data requested by the user equipment to the user equipment.

Another embodiment method for processing streaming media service data is also provided. A scheduling device receives a scheduling terminate message from a user equipment. The scheduling device stops scheduling, according to the scheduling terminate message, streaming media service data which is from a server and is requested by the user equipment to the user equipment.

A user equipment includes a first sending module, which is configured to send a scheduling terminate message to a scheduling device when the user equipment detects a service terminate operation or a service switching operation performed by a user, so that the scheduling device stops scheduling, according to the scheduling terminate message, streaming media service data requested by the user equipment to the user equipment.

Another embodiment scheduling device includes a receiving module, which is configured to receive a scheduling terminate message from a user equipment. An executing module is configured to stop scheduling, according to the scheduling terminate message received by the receiving module, streaming media service data which is from a server and is requested by the user equipment to the user equipment.

A system for processing streaming media service data includes a user equipment, a scheduling device and a server. The user equipment is configured to send a scheduling terminate message to the scheduling device when the user equipment detects a service terminate operation or a service switching operation performed by a user. The server is configured to deliver streaming media service data requested by the user equipment to the scheduling device. The scheduling device is configured to stop scheduling, according to the scheduling terminate message, the streaming media service data requested by the user equipment.

According to the method, device and system for processing streaming media service data provided by the embodiments of the present invention, a user equipment sends a scheduling terminate message to a scheduling device when the user equipment detects a service terminate operation or a service switching operation performed by a user, so that the scheduling device can timely learn that the user equipment has stopped a streaming media service being performed, and immediately stop scheduling, according to the scheduling terminate message, streaming media service data requested by the user equipment to the user equipment, thereby solving the problem of the waste of air interface resources on the scheduling device, resulted from the fact that the scheduling device continues to schedule the streaming media data that is not required by the user equipment to the user equipment during a long time after the user equipment has stopped the streaming media service being performed.

BRIEF DESCRIPTION OF THE DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and persons of ordinary skill in the art may still derive other drawings from the accompanying drawings without creative efforts.

DETAILED DESCRIPTION OF ILLUSTRATIVE EMBODIMENTS

Figure 1:
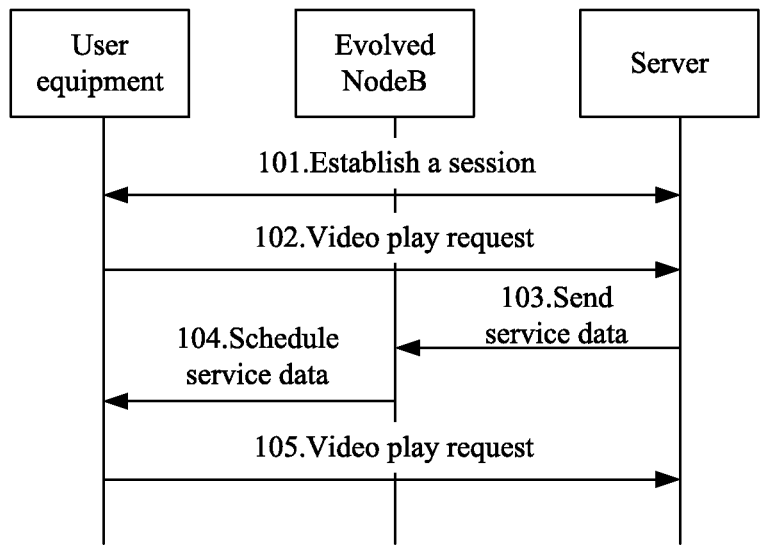
FIG. 1 is a flowchart of a conventional method for transmitting video service data in an LTE network.

The following clearly and describes the technical solutions in the embodiments of the present invention with reference to the accompanying drawings in the embodiments of the present invention. Apparently, the described embodiments are merely a part rather than all of the embodiments of the present invention. All other embodiments obtained by persons skilled in the art based on the embodiments given herein without making any creative effort are covered in the protection scope of the present invention.

A first embodiment (Embodiment 1) provides a method for processing streaming media service data, to process streaming media service data in an LTE network. When a user equipment detects a service terminate operation or a service switching operation performed by a user, the UE sends a scheduling terminate message to a scheduling device, so that the scheduling device stops scheduling, according to the scheduling terminate message, the streaming media service data requested by the user equipment to the user equipment.

Specifically, when a user needs to perform a streaming media service on the user equipment, for example, watching a video, the streaming media service data (video data) may be delivered by a server to the scheduling device and scheduled by the scheduling device to the user equipment, so that the user can watch the requested video on the user equipment.

When a user intends to stop or switch the streaming media service being performed, for example, stopping the video being watched or switching the video being watched to another video, an operation of stopping a service can be executed by using a user interface, for example, clicking a stop button on video play software to stop the video being watched, or an operation of switching is executed by using the user interface, for example, clicking the link of another video to stop the video being currently played and begin to play another video.

When the user equipment detects a service terminate operation or a service switching operation performed by a user, the user equipment sends a scheduling terminate message to the scheduling device; after receiving the scheduling terminate message, the scheduling device can learn that the user equipment has stopped the streaming media service being performed, and stops scheduling the streaming media service data requested by the user equipment to the user equipment.

In the method provided by this embodiment, when a user equipment detects a service terminate operation or a service switching operation performed by a user, the user equipment sends a scheduling terminate message to a scheduling device, so that the scheduling device can timely learn that the user equipment has stopped the streaming media service being performed, and the scheduling device can immediately stop scheduling the streaming media service data requested by the user equipment to the user equipment according to the scheduling terminate message, thereby solving the problem of the waste of air interface resources on the scheduling device, resulted from the fact that the scheduling device continues to schedule the streaming media data that is not required by the user equipment to the user equipment during a long time after the user equipment has stopped the streaming media service data being performed.

This embodiment also provides a user equipment, including a first sending module, which is configured to send a scheduling terminate message to a scheduling device when the user equipment detects a service terminate operation or a service switching operation performed by a user, so that the scheduling device stops scheduling, according to the scheduling terminate message, streaming media service data requested by the user equipment to the user equipment.

The user equipment can be various mobile terminals, such as a mobile phone; the method executed by modules in the user equipment has been detailed in this embodiment, and details are not repeat any more here.

For the user equipment provided by this embodiment, when the user equipment detects a service terminate operation or a service switching operation performed by a user, the user equipment sends a scheduling terminate message to a scheduling device, so that the scheduling device can timely learn that the user equipment has stopped a streaming media service being performed, and immediately stop scheduling the streaming media service data requested by the user equipment to the user equipment according to the scheduling terminate message, thereby solving the problem of the waste of air interface resources on the scheduling device, resulted from the fact that the scheduling device continues to schedule the streaming media data that is not required by the user equipment to the user equipment during a long time after the user equipment has stopped the streaming media service data being performed.

Figure 2:
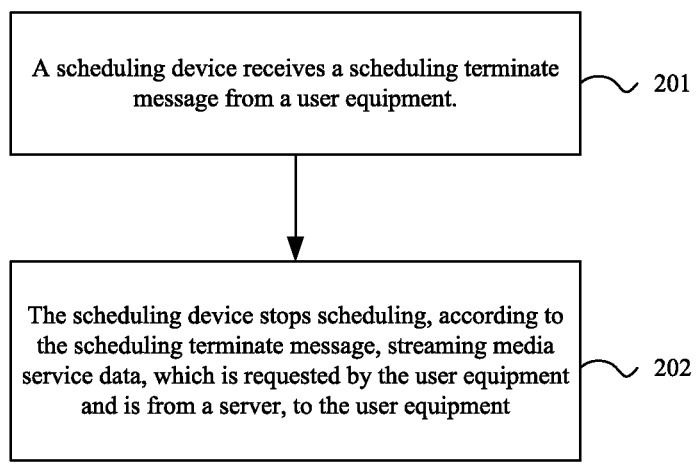
FIG. 2 is a flowchart of a method for processing streaming media service data according to Embodiment 2 of the present invention.

A second embodiment (Embodiment 2) provides a method for processing streaming media service data, to process the streaming media service data of a LTE network, as shown in FIG. 2, the method including following steps.

201. A scheduling device receives a scheduling terminate message from a user equipment.

Specifically, when the user equipment needs to perform a streaming media service, for example, needs to play a video, the user equipment first establishes a session with a server that provides the streaming media service. After the user equipment establishes the session with the server successfully, the server delivers corresponding streaming media service data to a scheduling device according to a request from the user equipment, that is, delivers the streaming media service data requested by the user equipment. The scheduling device may schedule the streaming media service data to the user equipment by using an LTE air interface, and the streaming media service data that is not scheduled to the user equipment is cached in the scheduling device. When the user equipment stops the streaming media service being performed or switches the streaming media service being performed to another streaming media service, for example, stops the video being played or plays another video, the user equipment sends the scheduling terminate message to the scheduling device.

202. The scheduling device stops scheduling, according to the scheduling terminate message, the streaming media service data, which is from the server and is requested by the user equipment, to the user equipment.

Specifically, after receiving the scheduling terminate message sent by the user equipment, the scheduling device can learn that the user equipment has stopped the streaming media service being performed, and may stop scheduling the streaming media service data requested by the user equipment to the user equipment.

For the method provided by this embodiment, when a user equipment stops a streaming media service being performed or switches the streaming media service being performed to another streaming media service, the user equipment sends a scheduling terminate message to a scheduling device, so that the scheduling device can timely learn that the user equipment has stopped the streaming media service being performed, and immediately stop scheduling, according to the scheduling terminate message, streaming media service data requested by the user equipment to the user equipment, thereby solving the problem of the waste of air interface resources on the scheduling device, resulted from the fact that the scheduling device continues to schedule the streaming media data that is not required by the user equipment to the user equipment during a long time after the user equipment has stopped the streaming media service data being performed.

Figure 3:
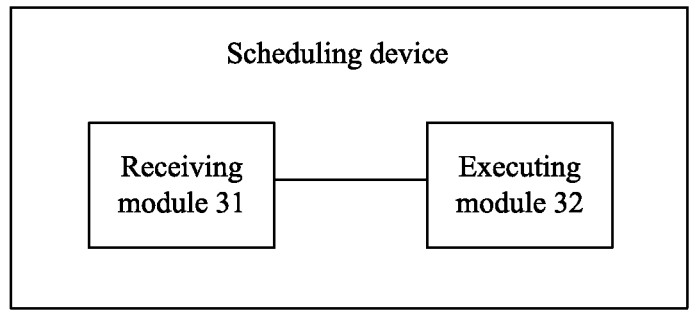
FIG. 3 is a block diagram of a scheduling device according to Embodiment 2 of the present invention.

This embodiment also provides a scheduling device, as shown in FIG. 3. A receiving module 31, is configured to receive a scheduling terminate message from a user equipment. An executing module 32 is configured to stop scheduling the streaming media service data that is from a server and is requested by the user equipment to the user equipment according to the scheduling terminate message received by the receiving module.

The method implemented by the modules has been detailed in this embodiment, and details are not repeated here any further.

For the scheduling device provided by this embodiment, when a user equipment stops a streaming media service being performed or switches the streaming media service being performed to another streaming media service, the user equipment sends a scheduling terminate message to a scheduling device, so that the scheduling device can timely learn that the user equipment has stopped the streaming media service being performed, and immediately stop scheduling, according to the scheduling terminate message, streaming media service data requested by the user equipment to the user equipment, thereby solving the problem of the waste of air interface resources on the scheduling device, resulted from the fact that the scheduling device continues to schedule the streaming media data that is not required by the user equipment to the user equipment during a long time after the user equipment has stopped the streaming media service data being performed.

Figure 4:
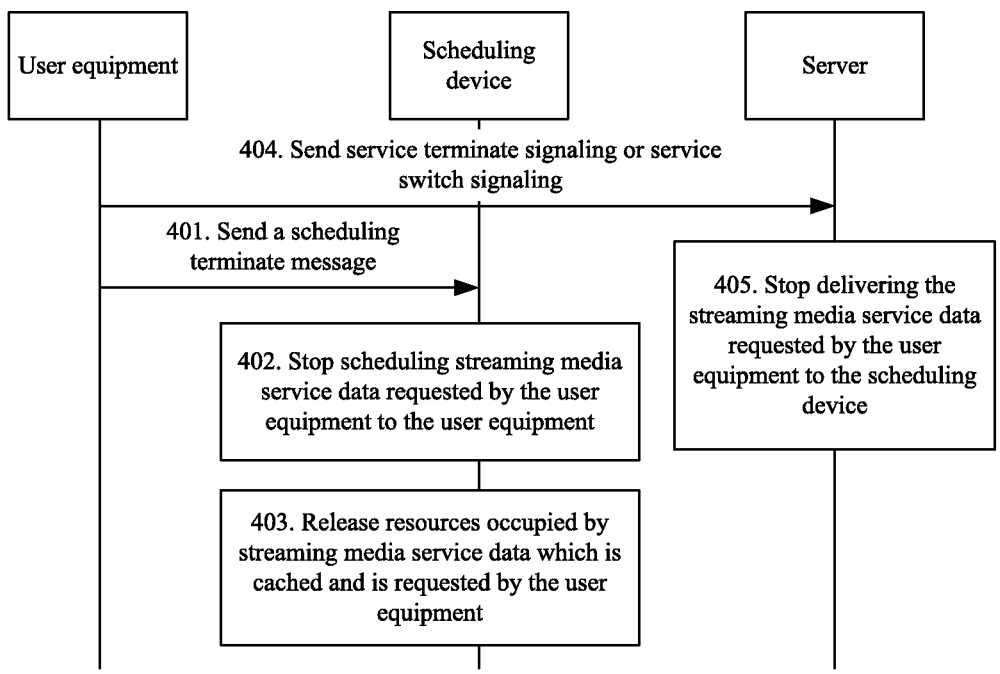
FIG. 4 is a flowchart of a method for processing streaming media service data according to Embodiment 3 of the present invention.

Another embodiment (Embodiment 3) provides a method for processing streaming media service data, to process the streaming media service data of a LTE network, as shown in FIG. 4, including following steps.

401. When a user equipment detects a service terminate operation or a service switching operation performed by a user, the user equipment sends a scheduling terminate message to a scheduling device.

Specifically, streaming media service data requested by the user equipment from a server is delivered firstly to the scheduling device, and is scheduled by scheduling device to the user equipment by using an LTE air interface, and the streaming media data which is not scheduled to the user equipment is cached in the scheduling device.

When a user intends to stop or switch the streaming media service being performed, for example, stop the video being watched or switching the video being watched to another video, a service stopping operation can be done by using a user interface, for example, clicking a stop button on video play software to stop the video being watched, or a service switching operation is performed by using the user interface, for example, clicking the link of another video to stop the video being currently played and begin to play another video.

In an LTE network, the scheduling device may be an eNodeB in an access network; when the user equipment stops the streaming media service being performed or switching the streaming media service being performed to another streaming media service, the scheduling terminate message sent by the user equipment to the eNodeB is an access stratum (AS) message, such as an RRC (radio resource control) message. The scheduling device may also be an MME (mobility management entity) in a core network. When the user equipment stops the streaming media service being performed or switching the streaming media service being performed to another streaming media service, the scheduling terminate message sent to the MME by the user equipment is a non-access stratum (NAS) message.

In addition, the scheduling device may also be two devices composed of core network nodes, for example, composed of an MME and a serving gateway (Serving GW), where the MME is configured to receive the scheduling terminate message sent by the user equipment, and the Serving GW is configured to receive the streaming media service data delivered by the server and requested by the user equipment and schedule the data. When the user equipment stops the streaming media service being performed, the MME may control the Serving GW by using other control signaling to stop scheduling streaming media service data to the user equipment after receiving the scheduling terminate message (a NAS message) sent by the user equipment.

Of course, the scheduling device is not limited to the above-described examples, and may also be other devices capable of scheduling or stopping scheduling streaming media service data according to the instruction of the user equipment in the LTE network.

402. The scheduling device stops scheduling the streaming media service data requested by the user equipment to the user equipment.

Specifically, after receiving the scheduling terminate message sent by the user equipment, the scheduling device stops scheduling the streaming media service data, requested by the user equipment, according to the instruction of the scheduling terminate message.

The scheduling terminate message may include a streaming media identifier, so that the scheduling device can directly find the streaming media service data (that is, the streaming media service data requested by the sender of scheduling terminate message) corresponding to the streaming media identifier, so as to stop scheduling the streaming media service data.

The streaming media identifier can be at least one of the following identifiers: a session identifier (Session Id), a media identifier (Media Id), a service data flow identifier (Service Data Flow Id), a bearer identifier (Bearer Id), and a logical channel identifier (Logical Channel Id). In the LTE network, each streaming media service data can be identified by the above streaming media identifiers, accordingly, the scheduling device can find the corresponding streaming media service data uniquely according to any of these identifiers.

Of course, the scheduling terminate message may not include a streaming media identifier, and can be another form of a message, which can be used for the present invention as long as it is capable of instructing the scheduling device to stop scheduling streaming media service data to the user equipment when the user equipment stops the streaming media service being currently performed in the LTE network.

403. The scheduling device releases resources occupied by the streaming media service data which is cached on the scheduling device and is requested by the user equipment.

When the scheduling device stops scheduling streaming media service data requested by the user equipment to the user equipment, the scheduling device still caches a part of streaming media service data requested by the user equipment; in order to prevent the data from occupying the hardware resources of the scheduling device, the scheduling device can release the resources occupied by the processed or unprocessed streaming media service data that is cached on the scheduling device and is requested by the user equipment, after the scheduling device stops scheduling streaming media service data to the user equipment.

The specific operations of releasing resources include, but not limited to, the following four ways.

1. Discarding the unprocessed service data which is cached in a PDCP (packet data convergence protocol, Packet Data Convergence Protocol) layer and is in the streaming media service data requested by the user equipment.

2. Discarding the service data which is processed to be a PDCP PDU (packet data convergence protocol protocol data unit, PDCP Protocol Data Unit) and is in the streaming media service data requested by the user equipment.

3. Instructing an RLC (radio link control, Radio Link Control) layer to release the service data which is delivered to the RLC layer and is in the streaming media service data requested by the user equipment.

4. Instructing a MAC (media access control, Medium Access Control) layer to release the service data which is processed to be HARQ (hybrid automatic repeat request, Hybrid Automatic Repeat Request) data and is in the streaming media service data requested by the user equipment, where the HARQ data does not include the data obtained by processing other streaming media service data than the streaming media service data.

In other words, the HARQ data can only include the data obtained by processing the streaming media service data requested by the sender of the scheduling terminate message; if the HARQ data includes the data obtained by processing the streaming media service data requested by another user equipment, the scheduling device continues to schedule the data to the another user equipment.

For example, the HARQ data includes data A and data B, where the data A is data obtained by processing the streaming media service data requested by a user equipment a, and the data B is data obtained by processing the streaming media service data requested by a user equipment b; if the scheduling terminate message received by the scheduling device is sent by the user equipment a, the scheduling device continues to schedule the HARQ data to the user equipment b.

5. Discarding the streaming media service data received from the server.

That is, after receiving the scheduling terminate message sent by the user equipment, the scheduling device may also continue to receive the streaming media service data from the server, where the data is requested by the user equipment and belongs to useless data; if the data is processed, software and hardware resources of the scheduling device may be consumed; so that when the scheduling device determines that the received streaming media service data is requested by the user equipment, the scheduling device may directly discard the data.

Based on the description above, when the user equipment detects a service terminate operation performed by a user, the user equipment may send a scheduling terminate message to the scheduling device according to step 401. Before or after this step, the user equipment may also send service terminate signaling to a server according to step 404, so that the server stops delivering the streaming media service data, requested by the user equipment, to the scheduling device according to the service terminate signaling.

Furthermore, based on the description above, when the user equipment detects a service switching operation performed by a user, the user equipment sends a scheduling terminate message to the scheduling device according to step 401. Before or after this step, the user equipment may also send service switching signaling to a server according to step 404, so that the server stops delivering the streaming media service data, requested by the user equipment before switching, to the scheduling device according to the service terminate signaling, and delivers streaming media service data which is requested by the user equipment after switching.

It should be noted that FIG. 4 shows the situation of performing step 404 before step 401, but the order of performing step 404 and step 401 is not limited thereto, step 404 may also be performed after step 401.

After receiving the service terminate signaling or service switching signaling, the server may perform step 405, i.e., stopping delivering the streaming media service data requested by the user equipment to the scheduling device.

In this embodiment, when a user equipment detects a service terminate operation or a service switching operation performed by a user, the user equipment sends a scheduling terminate message to a scheduling device, so that the scheduling device can timely learn that the user equipment has stopped a streaming media service being performed, and immediately stop scheduling streaming media service data requested by the user equipment to the user equipment according to the scheduling terminate message, thereby solving the problem of the waste of air interface resources on the scheduling device, resulted from the fact that the scheduling device continues to schedule the streaming media data that is not required by the user equipment to the user equipment during a long time after the user equipment has stopped the streaming media service data being performed.

Additionally, the scheduling device may release, according to the received scheduling terminate message, the resources occupied by the streaming media service data requested by the user equipment, and therefore the released resources on the scheduling device can be used for processing other useful data.

Figure 5:
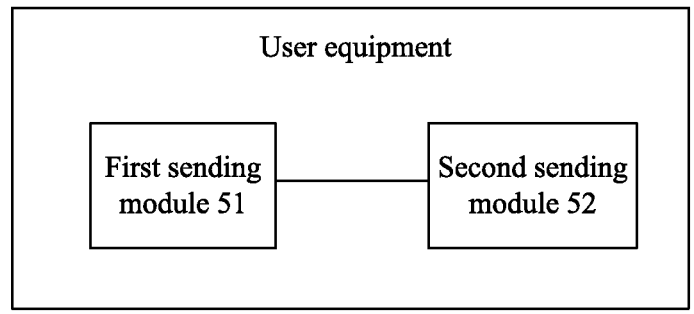
FIG. 5 is a block diagram of a user equipment according to Embodiment 4 of the present invention.

Another embodiment (Embodiment 4) provides a user equipment, as shown in FIG. 5. A first sending module 51, is configured to send a scheduling terminate message to a scheduling device when the user equipment detects a service terminate operation or a service switching operation performed by a user, so that the scheduling device stops scheduling the streaming media service data requested by the user equipment to the user equipment according to the scheduling terminate message. A second sending module 52 is configured to send service terminate signaling to a server, when the user equipment detects a service terminate operation performed by a user, and before or after the first sending module 51 sends the scheduling terminate message to the scheduling device, so that the server stops delivering the streaming media service data requested by the user equipment to the scheduling device according to the service terminate signaling. Alternatively, the second module 52 can be configured to send service switching signaling to a server, when the user equipment detects a service switching operation performed by a user and before or after the first sending module 51 sends the scheduling terminate message to the scheduling device, so that the server stops delivering the streaming media service data, requested by the user equipment before switching, to the scheduling device according to the service switching signaling; and delivers streaming media service data which is requested by the user equipment after switching.

The scheduling terminate message may include a streaming media identifier. The first sending module 51 is also configured to enable the scheduling device to stop scheduling the streaming media service data, corresponding to the streaming media identifier, to the user equipment according to the scheduling terminate message.

The method performed by the modules of the user equipment is detailed in Embodiment 1 and Embodiment 3, and details are not repeated any more here.

For the user equipment provided by this embodiment, when the user equipment detects a service terminate operation or a service switching operation performed by a user, the user equipment sends a scheduling terminate message to a scheduling device, so that the scheduling device can timely learn that the user equipment has stopped a streaming media service being performed, and immediately stop scheduling, according to the scheduling terminate message, streaming media service data requested by the user equipment to the user equipment, thereby solving the problem of the waste of air interface resources on the scheduling device, resulted from the fact that the scheduling device continues to schedule the streaming media data that is not required by the user equipment to the user equipment during a long time after the user equipment has stopped the streaming media service data being performed.

Figure 6:
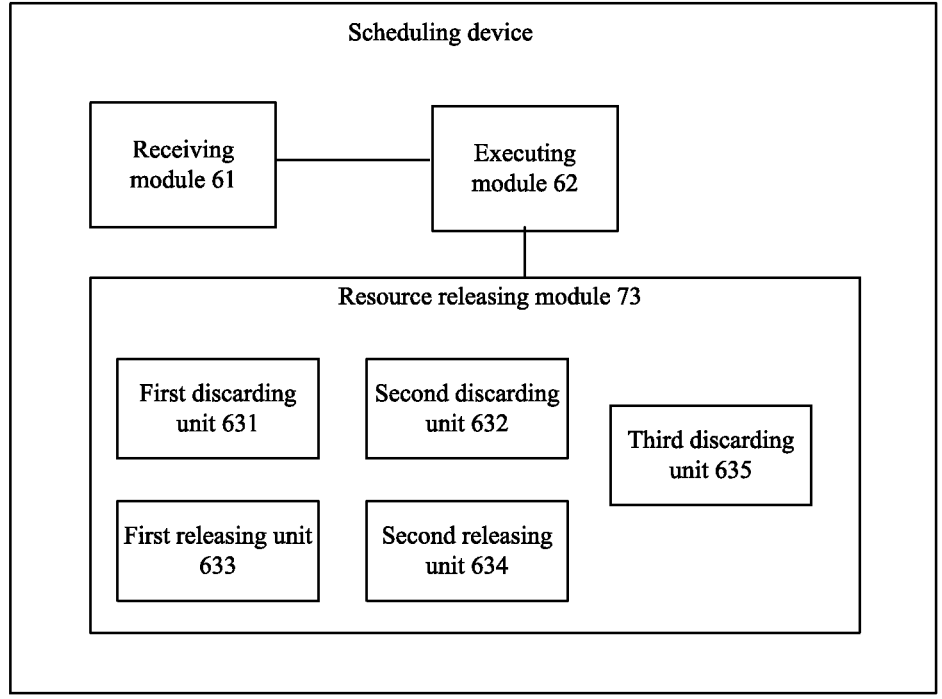
FIG. 6 is a block diagram of a scheduling device according to Embodiment 4 of the present invention.

This embedment also provides a scheduling device, as shown in FIG. 6. A receiving module 61 is configured to receive a scheduling terminate message from a user equipment. An executing module 62 is configured to stop scheduling the streaming media service data which is from a server and is requested by the user equipment to the user equipment according to the scheduling terminate message received by the receiving module 61.

The scheduling device may also include a resource release module 63, configured to release, according to the scheduling terminate message received by the receiving module 61, resources occupied by the streaming media service data, after the executing module 62 stops scheduling the streaming media service data, which is requested by the user equipment and is from the server, to the user equipment.

The resource release module 63 may include a first discarding unit 631, which is configured to discard unprocessed service data which is cached in a packet data convergence protocol layer and is in the streaming media service data. A second discarding unit 632 is configured to discard service data which is processed to be a packet data convergence protocol protocol data unit and is in the streaming media service data. A first releasing unit 633 is configured to instruct a radio link control layer to release service data which is delivered to the radio link control layer and is in the streaming media service data. A second releasing unit 634 is configured to instruct a media access control layer to release service data which is processed to be hybrid automatic repeat request data and is in the streaming media service data. A third discarding unit 635 is configured to discard the streaming media service data received from the server.

The scheduling device can be an eNodeB, and the scheduling terminate message is an AS message. The scheduling device may also be an MME and the scheduling terminate message is a NAS message.

The scheduling terminate message may include a streaming media identifier; the executing module 62 is also configured to stop scheduling the streaming media service data, which is corresponding to the streaming media identifier and is from the server, to the user equipment according to the streaming media identifier.

The method performed by the modules of abovementioned scheduling device is detailed in Embodiment 2 and Embodiment 3, and details are not repeated here any further.

According to the scheduling device provided by this embodiment, when a user equipment detects a service terminate operation or a service switching operation performed by a user, the user equipment sends a scheduling terminate message to a scheduling device, so that the scheduling device can timely learn that the user equipment has stopped a streaming media service being performed, and immediately stop scheduling, according to the scheduling terminate message, streaming media service data requested by the user equipment to the user equipment, thereby solving the problem of the waste of air interface resources on the scheduling device, resulted from the fact that the scheduling device continues to schedule the streaming media data that is not required by the user equipment to the user equipment during a long time after the user equipment has stopped the streaming media service data being performed.

In addition, the scheduling device releases the resources, occupied by the streaming media service data requested by the user equipment, according to the received scheduling terminate message by using the resource release module, so that the released resources on the scheduling device can be used for processing other data.

Figure 7:
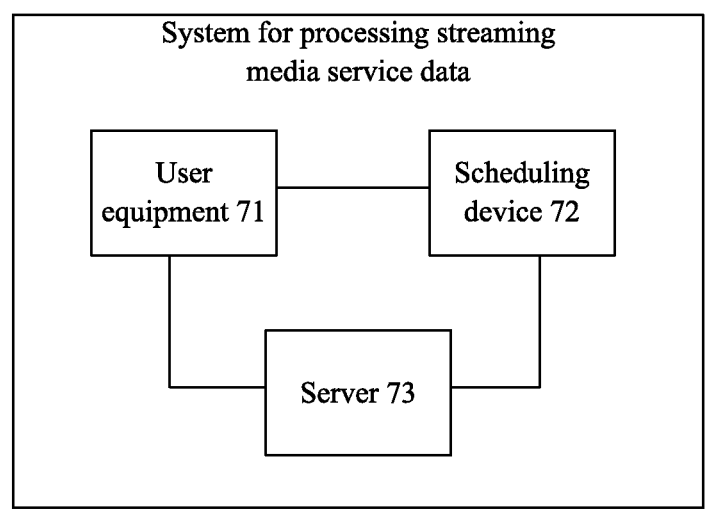
FIG. 7 is a block diagram of a system for processing streaming media service data according to Embodiment 4 of the present invention.

This embodiment also provides a system for processing streaming media service data, as shown in FIG. 7, including a user equipment 71, a scheduling device 72 and a server 73.

The user equipment 71 is configured to send a scheduling terminate message to the scheduling device 72 when detecting a service terminate operation or a service switching operation performed by a user.

The server 73 is configured to deliver the streaming media service data requested by the user equipment to the scheduling device.

The scheduling device 72 is configured to stop scheduling the streaming media service data, requested by the user equipment, according to the scheduling terminate message.

The method performed by the modules in the system is detailed in Embodiment 1 to Embodiment 3, and details are not repeated here any further.

For the system provided by this embodiment, when a user equipment detects a service terminate operation or a service switching operation performed by a user, the user equipment sends a scheduling terminate message to a scheduling device, so that the scheduling device can timely learn that the user equipment has stopped a streaming media service being performed, and immediately stop scheduling streaming media service data requested by the user equipment to the user equipment according to the scheduling terminate message, thereby solving the problem of the waste of air interface resources on the scheduling device, resulted from the fact that the scheduling device continues to schedule the streaming media data that is not required by the user equipment to the user equipment during a long time after the user equipment has stopped the streaming media service data being performed.

Through the foregoing description of the embodiments, it is clear to persons skilled in the art that the present invention may be implemented by software plus necessary general hardware, and of course, may also be implemented by hardware, but in many cases, the software implementation is preferred. Based on such understanding, the technical solutions of the present invention essentially, or the part contributing to the prior art may be implemented in the form of a software product. The computer software product is stored in a readable storage medium, for example, a floppy disk, hard disk, or optical disk of the computer, and includes several instructions for instructing a computer device (which may be a personal computer, a server, or a network device) to perform the methods described in the embodiments of the present invention.

The foregoing description is merely about the specific embodiments of the present invention, but is not intended to limit the protection scope of the present invention. Any variation or replacement readily figured out by persons skilled in the art within the technical scope of the present invention shall fall within the protection scope of the present invention. Therefore, the protection scope of the present invention shall be subject to the protection scope of the claims.

What is claimed is:

1. A method for processing streaming media service data in an LTE (long term evolution) system, the method comprising:
   receiving, by a scheduling device, a scheduling terminate message from a user equipment, wherein the scheduling terminate message indicates the scheduling device is to stop scheduling streaming media service data corresponding to a first streaming media service;
   stopping scheduling, by the scheduling device and according to the scheduling terminate message, LTE air interface resources for transmitting streaming media service data corresponding to the first streaming media service to the user equipment, wherein the streaming media service data corresponding to the first streaming media service is delivered from a server and is requested by the user equipment; and
   releasing, by the scheduling device, the LTE air interface resources occupied by the streaming media service data according to the scheduling terminate message, wherein releasing the resources occupied by the streaming media service data comprises at least one of discarding unprocessed service data which is in the streaming media service data and is cached in a packet data convergence protocol layer, discarding service data which is in the streaming media service data and is processed to be a packet data convergence protocol data unit, and instructing a radio link control layer to release service data which is in the streaming media service data and is delivered to the radio link control layer, instructing a media access control layer to release service data which is in the streaming media service data and is processed to be hybrid automatic repeat request data, wherein the hybrid automatic repeat request data does not comprise data obtained by processing other streaming media service data than the streaming media service data.

2. The method according to claim 1, wherein the scheduling device is an evolved NodeB (eNodeB) and the scheduling terminate message is an access stratum (AS) message.

3. The method according to claim 1, wherein the scheduling device is a mobility management entity (MME) and the scheduling terminate message is a non-access stratum (NAS) message.

4. The method according to claim 1, wherein the scheduling terminate message comprises a streaming media identifier and wherein stopping scheduling comprises stopping sending the streaming media service data which is from the server and is corresponding to the streaming media identifier by using the LTE air interface resources.

5. The method according to claim 1, further comprising discarding the streaming media service data corresponding to the first streaming media service which is received from the server and cached in the scheduling device.

6. The method according to claim 1, wherein releasing the resources occupied by the streaming media service data comprises discarding unprocessed service data which is in the streaming media service data and is cached in a packet data convergence protocol layer.

7. The method according to claim 1, wherein releasing the resources occupied by the streaming media service data comprises discarding service data which is in the streaming media service data and is processed to be a packet data convergence protocol data unit.

8. The method according to claim 1, wherein releasing the resources occupied by the streaming media service data comprises instructing a radio link control layer to release service data which is in the streaming media service data and is delivered to the radio link control layer.

9. The method according to claim 1, wherein releasing the resources occupied by the streaming media service data comprises instructing a media access control layer to release service data which is in the streaming media service data and is processed to be hybrid automatic repeat request data, wherein the hybrid automatic repeat request data does not comprise data obtained by processing other streaming media service data than the streaming media service data.

10. A scheduling device in an LTE (long term evolution) system, comprising a processor and a non-transitory processor-readable medium having processor-executable instructions stored thereon, the processor executable instructions including a plurality of modules, the modules including:
   a receiving module, configured to receive a scheduling terminate message from a user equipment, wherein the scheduling terminate message indicates the scheduling device is to stop scheduling streaming media service data corresponding to a first streaming media service;
   an executing module, configured to stop scheduling LTE air interface resources for transmitting streaming media service data corresponding to the first streaming media service to the user equipment according to the scheduling terminate message received by the receiving module, wherein the streaming media service data corresponding to the first streaming media service is delivered from a server and is requested by the user equipment to the user equipment; and a resource release module, configured to, after the executing module stops scheduling the streaming media service data, which is requested by the user equipment and is from the server, to the user equipment, release, LTE air interface resources occupied by the streaming media service data according to the scheduling terminate message received by the receiving module;

wherein the resource release module comprises at least one of a first discarding unit, configured to discard unprocessed service data which is in the streaming media service data and is cached in a packet data convergence protocol layer, a second discarding unit, configured to discard service data which is in the streaming media service data and is processed to be a packet data convergence protocol protocol data unit, and a first releasing unit, configured to instruct a radio link control layer to release service data which is in the streaming media service data and is delivered to the radio link control layer, and a second releasing unit, configured to instruct a media access control layer to release service data which is in the streaming media service data and is processed to be hybrid automatic repeat request data, wherein the hybrid automatic repeat request data does not comprise data obtained by processing other streaming media service data than the streaming media service data.

11. The scheduling device according to claim 10, wherein the scheduling terminate message comprises a streaming media identifier and wherein the executing module is further configured to stop scheduling LTE air interface resources for transmitting the streaming media service data which is corresponding to the streaming media identifier and is from the server, to the user equipment according to the scheduling terminate message.

12. The scheduling device according to claim 10, further comprising a third discarding unit, configured to discard the streaming media service data corresponding to the first streaming media service which is received from the server and cached in the scheduling device.

13. The scheduling device according to claim 10, wherein the scheduling device is an evolved NodeB (eNodeB) and the scheduling terminate message is an access stratum (AS) message.

14. The scheduling device according to claim 10, wherein the scheduling device is a mobility management entity (MME) and the scheduling terminate message is a non-access stratum (NAS) message.

15. A method for processing streaming media service data, the method comprising:
receiving, by a scheduling device, a scheduling terminate message from a user equipment, wherein the scheduling terminate message indicates the scheduling device is to stop scheduling streaming media service data corresponding to a first streaming media service;
stopping scheduling, by the scheduling device and according to the scheduling terminate message, streaming media service data corresponding to the first streaming media service to the user equipment, wherein the streaming media service data corresponding to the first streaming media service is delivered from a server and is requested by the user equipment; and
releasing, by the scheduling device and according to the scheduling terminate message, resources occupied by the streaming media service data, wherein the releasing comprises:
discarding unprocessed service data which is in the streaming media service data and is cached in a packet data convergence protocol layer;
discarding service data which is in the streaming media service data and is processed to be a packet data convergence protocol data unit;
instructing a radio link control layer to release service data which is in the streaming media service data and is delivered to the radio link control layer;
instructing a media access control layer to release service data which is in the streaming media service data and is processed to be hybrid automatic repeat request data, wherein the hybrid automatic repeat request data does not comprise data obtained by processing other streaming media service data than the streaming media service data; and
discarding the streaming media service data received from the server.

* * * * *